(12) United States Patent
Rath et al.

(10) Patent No.: US 7,217,773 B2
(45) Date of Patent: May 15, 2007

(54) METHOD FOR PRODUCING POLYISOBUTENE

(75) Inventors: Hans Peter Rath, Gruenstadt (DE); Thomas Perner, Esslingen (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 56 days.

(21) Appl. No.: 10/542,928

(22) PCT Filed: Jan. 23, 2004

(86) PCT No.: PCT/EP2004/000569

§ 371 (c)(1),
(2), (4) Date: Jul. 21, 2005

(87) PCT Pub. No.: WO2004/065432

PCT Pub. Date: Aug. 5, 2004

(65) Prior Publication Data

US 2006/0063901 A1    Mar. 23, 2006

(30) Foreign Application Priority Data

Jan. 24, 2003  (DE)  ............................... 103 03 212

(51) Int. Cl.
  *C08F 4/14*   (2006.01)
  *C08F 110/10*  (2006.01)
(52) U.S. Cl. .................. 526/208; 526/209; 526/212; 526/237; 526/348.7; 585/521; 585/525
(58) Field of Classification Search ............... 526/208, 526/209, 212, 237, 348.7; 585/521, 525
See application file for complete search history.

(56) References Cited

U.S. PATENT DOCUMENTS 5,286,823 A    2/1994  Rath 6,407,186 B1    6/2002  Rath et al.

FOREIGN PATENT DOCUMENTS

| DE | 27 02 604 | 7/1978 |
| EP | 0 628 575 | 12/1994 |
| EP | 0 896 967 | 2/1999 |
| EP | 1 026 175 | 8/2000 |
| EP | 1 081 165 | 3/2001 |
| WO | 93/10063 | 5/1993 |
| WO | 02/40553 | 5/2002 |

OTHER PUBLICATIONS

Research Disclosure Database No. 424060, "Polymerisation Process," Research Disclosure Journal ISSN 0374-4353, Kenneth Mason Publications Ltd., UK, Aug. 1999 (Anonymous).*
English language translation of CN 1323841, published Nov. 28, 2001.*

* cited by examiner

*Primary Examiner*—Fred M. Teskin
(74) *Attorney, Agent, or Firm*—Oblon, Spivak, McClelland, Maier & Neustadt, P.C.

(57) ABSTRACT

A process is described for preparing polyisobutene having a content of terminal vinylidene groups of at least 75 mol % by polymerizing isobutene or isobutenic hydrocarbon mixtures in the liquid phase in the presence of a boron trifluoride complex catalyst of the composition $$(BF_3)_a \cdot L^1_b \cdot L^2_c \cdot L^3_d$$

where $L^1$ is water, a primary $C_1$–$C_5$-alkanol and/or a secondary $C_3$–$C_5$-alkanol, $L^2$ is at least one aldehyde and/or one ketone, $L^3$ is an ether having at least 5 carbon atoms, a secondary alkanol having at least 6 carbon atoms, a primary alkanol having at least 6 carbon atoms and/or a tertiary alkanol, the b:a ratio is in the range from 0.9 to 3.0, the c:a ratio is in the range from 0.01 to 0.5, and the d:a ratio is in the range from 0 to 1.0.

13 Claims, No Drawings

METHOD FOR PRODUCING POLYISOBUTENE

BACKGROUND OF THE INVENTION

1. Field of the Invention

The present invention relates to a process for preparing polyisobutene having a content of terminal vinylidene groups of at least 75 mol %.

2. Description of the Background

For the purposes of the present application, terminal vinylidene groups or terminal double bonds are those double bonds whose position in the polyisobutene macromolecule is described by the general formula

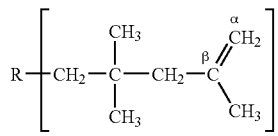

where R is a polyisobutenyl radical. The type and the proportion of the double bonds present in the polyisobutene can be determined with the aid of $^1H$ or $^{13}C$ NMR spectroscopy.

Such highly reactive polyisobutenes are used as intermediates for preparing additives for fuels and lubricants, as described, for example, in DE-A 27 02 604. The highest reactivity is exhibited by the terminal vinylidene groups having 2-methyl substitution, whereas neopentyl substitution or double bonds disposed further toward the center of the macromolecule, depending on their position in the macromolecule, exhibit only slight reactivity, if any, in the customary functionalization reactions. The proportion of terminal vinylidene groups in the molecule is therefore the most important quality criterion for this type of polyisobutene.

U.S. Pat. No. 5,286,823 describes a process for preparing highly reactive polyisobutenes by cationic polymerization of isobutene in the presence of boron trifluoride and secondary alcohols having from 3 to 20 carbon atoms and/or ethers having from 2 to 20 carbon atoms.

WO 93/10063 discloses boron trifluoride etherate complexes in which the ether has at least one tertiary carbon atom bonded to the ether oxygen atom. The complexes serve to polymerize olefins, in particular isobutene, to polymers having a high content of vinylidene groups.

EP-A 1 026 175 describes the preparation of isobutene polymers having at least 80 mol % of molecules with terminal vinylidene structure using complex catalysts of boron trifluoride, ether and alcohol and/or water in certain amounts.

SUMMARY OF THE INVENTION

Among other factors, the achievable molecular weight of the polyisobutene depends decisively on the relative amount of the boron trifluoride complex catalyst based on the olefin monomers used. Larger amounts of catalyst achieve lower molecular weights and vice versa. The amount of boron trifluoride required in the preparation of low molecular weight polyisobutenes constitutes a considerable cost factor. The disposal of the catalyst deactivation products extracted into an aqueous phase also entails a considerable wastewater burden. U.S. Pat. No. 6,407,186 and WO02/40553 therefore recommend processes for removing and recycling the catalyst.

It is an object of the present invention to provide a process for preparing polyisobutene having a high content of terminal vinylidene double bonds, in which lower molecular weights can be obtained at a given relative amount of boron trifluoride catalyst or the amount of catalyst can be reduced in order to obtain a given molecular weight.

We have found that this object is achieved by a process for preparing polyisobutene having a content of terminal vinylidene double bonds of at least 75 mol % by polymerizing isobutene or isobutenic hydrocarbon mixtures in the liquid phase in the presence of a boron trifluoride complex catalyst of the composition

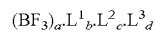

where
- $L^1$ is water, a primary $C_1-C_5$-alkanol and/or a secondary $C_3-C_5$-alkanol,
- $L^2$ is at least one aldehyde and/or ketone,
- $L^3$ is an ether having at least 5 carbon atoms, a secondary alkanol having at least 6 carbon atoms, a primary alkanol having at least 6 carbon atoms and/or a tertiary alkanol,
- the b:a ratio is in the range from 0.9 to 3.0, preferably from 1.1 to 2.5,
- the c:a ratio is in the range from 0.01 to 0.5, preferably from 0.04 to 0.3,
- the d:a ratio is in the range from 0 to 1.0, preferably from 0.1 to 1, in particular from 0.1 to 0.6.

DETAILED DESCRIPTION OF THE PREFERRED EMBODIMENTS

Useful feedstocks (isobutene feedstocks) for the process according to the invention are both pure isobutene and isobutenic hydrocarbon mixtures, for example low-butadiene $C_4$ raffinates from crackers or $C_4$ cuts of isobutane dehydrogenation having isobutene contents of more than 40% by weight. It is also possible to use inert solvents such as saturated hydrocarbons, for example pentane, hexane, isooctane or halogenated hydrocarbons such as dichloromethane or trichloromethane.

The catalysts used in the process according to the invention are boron trifluoride complexes having at least one starter selected from water, primary $C_1-C_5$-alkanols and secondary $C_3-C_5$-alkanols, at least one regulator selected from aldehydes and ketones and optionally at least one solubilizer selected from ethers having at least 5 carbon atoms, secondary alkanols having at least 6 carbon atoms, primary alkanols having at least 6 carbon atoms and tertiary alkanols. The specific combination of starter and regulator influences the polymerization activity of the boron trifluoride in such a way that the polymerization firstly results in a low molecular weight polyisobutene and secondly the isomerization activity of the boron trifluoride with regard to the isomerization of terminal double bonds to double bonds disposed in the interior of the polyisobutene molecule and having no or only little reactivity is reduced. The terms "starter", "regulator" and "solubilizer" serve merely for illustration.

The starters $L^1$ are compounds having a hydrogen atom without significant steric hindrance bonded to an oxygen atom. They are referred to a "starters" because their active hydrogen atom is incorporated at the beginning of the growing polyisobutene chain. Examples of suitable $L^1$ are water, methanol, ethanol, 2-propanol and/or 1-propanol. Among these, greatest preference is given to methanol.

According to the invention, the regulators $L^2$ are aldehydes and/or ketones which typically have from 1 to 20, preferably from 2 to 10 carbon atoms, and in which functional groups other than the carbonyl group are preferably absent. Examples of suitable $L^2$ are formaldehyde, acetaldehyde, propionaldehyde, n-butyraldehyde, isobutyraldehyde, acetone, methyl ethyl ketone and diethyl ketone. Greatest preference is given to acetone.

The solubilizers $L^3$ have a solubilizing action and increase the solubility of the catalyst complex in the starting material. These are ethers having at least 5 carbon atoms or long-chain and/or sterically hindered alcohols which offer screening against the entry of isobutene molecules. Preference is given to using dialkyl ethers having from 5 to 20 carbon atoms, a secondary alkanol having from 6 to 20 carbon atoms, a primary alkanol having from 6 to 20 carbon atoms and/or a tertiary $C_4$–$C_{20}$-alkanol. When primary alkanols are used, these preferably have a β-branching, i.e. a branching at the carbon atom neighboring the carbon atom which bears the hydroxyl group. Suitable representatives are, for example, selected from methyl tert-butyl ether, di-n-butyl ether, di-n-hexyl ether, dioctyl ether, 2-ethylhexanol, 2-propylheptanol, the oxo alcohols of dimeric, trimeric and tetrameric propylene, and dimeric and trimeric butene, linear 1-alcohols (which are obtainable, for example, by the Alfol® process), as long as they are liquid under the reaction conditions, such as n-hexanol or n-octanol, and tert-butanol. Among these, greatest preference is given to 2-ethylhexanol.

The boron trifluoride complex catalysts can be preactivated before they are used or generated in situ in the polymerization reactor, as described in EP-A 628 575. The raw material used for preparing the boron trifluoride complex catalysts is advantageously the gaseous boron trifluoride, which may be technical-grade boron trifluoride still containing small amounts of sulfur dioxide and $SiF_4$ (purity: 96.5% by weight), although preference is given to using highly pure boron trifluoride (purity: 99.5% by weight). Particular preference is given to using silicon tetrafluoride-free boron trifluoride for the catalyst preparation.

Preference is given to using from 0.1 to 25 mmol, in particular from 0.5 to 10 mmol, of complex catalyst, calculated as boron trifluoride, per mole of olefin monomers.

Preference is given to polymerizing the isobutene in a continuous process. To this end, conventional reactors such as tubular reactors, tube bundle reactors or stirred tanks may be used. The polymerization is preferably effected in a loop reactor, i.e. a tubular or tube bundle reactor having constant circulation of the reaction mixture, and the ratio of feed to circulation F/C can generally be varied within the range from 1:5 to 1:500, preferably within the range from 1:10 to 1:200 v/v.

The polymerization is advantageously effected at temperatures below 0° C., preferably at temperatures in the range from 0 to −40° C., in particular in the range from 0 to −30° C. and more preferably in the range from −10 to −30° C. In general, the polymerization is carried out at a pressure in the range from 0.5 to 20 bar (absolute). The choice of the pressure range is governed primarily by the process engineering conditions. For instance, in the case of stirred tanks, it is recommended to work with evaporative cooling and therefore under autogenous pressure, i.e. subatmospheric pressure, whereas circulation reactors (loop reactors) work better at superatmospheric pressure. At the same time, pressure and turbulence accelerate the metering in of boron trifluoride, so that preference is given to this reactor type. However, the choice of the pressure is generally unimportant to the result of the polymerization reaction.

Preference is given to carrying out the polymerization under isothermal conditions. Since the polymerization reaction proceeds exothermically, the heat of polymerization in this case has to be removed. This is generally done with the aid of a cooling apparatus which can be operated, for example, with liquid ammonia as the coolant. Another possibility is to remove the heat of polymerization by evaporative cooling on the product side of the reactor. This is done by evaporation of the isobutene and/or other volatile constituents of the isobutene feedstock. The method of cooling depends on the reactor type used in each case. Tubular reactors are preferably cooled by means of external cooling, and the reaction tubes are, for example, cooled by means of a cooling jacket with boiling ammonia. Stirred tank reactors are preferably thermostated by internal cooling, for example by means of cooling coils, or by evaporative cooling on the product side.

Depending on the reaction conditions and the desired properties of the polymer to be prepared, the residence time of the isobutene to be polymerized in the reactor is in the range from 1 to 120 minutes, preferably in the range from 5 to 60 minutes.

For workup, the reaction effluent is advantageously conducted into a medium which deactivates the polymerization catalyst and in this way terminates the polymerization. To this end, for example, water, alcohols, ethers, acetonitrile, ammonia, amines or aqueous solutions of mineral bases such as alkali metal and alkaline earth metal hydroxide solutions, solutions of carbonates of these metals, and the like can be used. Preference is given to terminating with water at a temperature of from 20 to 40° C., for example in the form of scrubbing under pressure. The temperature of the water used depends on the desired mixing temperature at which the phase separation takes place. In the further course of the workup, the polymerization mixture is optionally subjected to one or more extractions to remove residues of catalyst, typically methanol, or water scrubbing. In the water scrubbing, apart from the catalyst, hydrogen fluoride formed in the course of the polymerization is also removed. Subsequently, unconverted isobutene, solvent and volatile isobutene oligomers are removed distillatively. The bottoms are freed of residues of solvent and monomers, for example using thin-film evaporators, falling-film evaporators, annular-gap evaporators or Sambay evaporators, optionally with the addition of steam or nitrogen gas.

When pure isobutene is used as the starting material, it can be recycled into the polymerization, in the same way as isobutene oligomers and solvents. When isobutenic $C_4$ cuts are used, the unconverted isobutene and the remaining $C_4$ hydrocarbons are generally not recycled, but rather fed to other uses, for example the preparation of low molecular weight polyisobutene or of methyl t-butyl ether. Volatile fluorine-containing by-products such as sec-butyl and tert-butyl fluoride can be removed from the polyisobutene together with the other hydrocarbons and separated from these hydrocarbons distillatively or extractively.

The process according to the invention enables highly reactive polyisobutenes to be prepared both from pure isobutene and from isobutenic hydrocarbon mixtures. The process according to the invention allows number-average molecular weights in the range from 500 to 50000 dalton, preferably from 500 to 5000 dalton, in particular from 500 to 2500 dalton, at a content of terminal double bonds of at least 75 mol %, preferably at least 78 mol %, in particular at least 80 mol %. In addition, the polyisobutenes obtained are characterized by a narrow molecular weight distribution. They preferably have a dispersity $M_w/M_n$ in the range from 1.3 to 5, in particular from 1.3 to 2.

The invention is illustrated by the examples which follow.

EXAMPLES

A circulation reactor was used which consisted of a Teflon hose having an internal diameter of 6 mm and a length of 7.1 m through which 1000 l/h of reactor contents were circulated by a gear pump. Tube and pump had a capacity of 200 ml. Teflon hose and pump head were disposed in a cold bath at a temperature of −25° C. The feed used was a hydrocarbon stream of the following composition (in % by weight) which was obtained by selective butadiene hydrogenation of a $C_4$ cut stemming from a steam cracker operated with naphtha:

| | |
|---|---|
| Isobutane | 3 |
| n-Butane | 14 |
| Isobutene | 28 |
| 1-Butene | 23 |
| cis-2-Butene | 11 |
| trans-2-Butene | 21 |
| Butadiene | 0.050 |

The feed rate was 700 g/h. The feed was dried over 3 Å molecular sieves at 5° C. to a water content of less than 3 ppm, precooled to −25° C. and fed to the circulation reactor. $BF_3$ and complexing agent were fed in the amounts specified in the table which follows to the suction side of the circulation pump directly into the circulation reactor. The effluent was quenched in a mixing pump immediately after leaving the circulation reactor with aliquots of water, the aqueous phase was removed and the organic phase was dried over 3 Å molecular sieves. After low boilers and isobutene oligomers had been removed at 220° C. and 2 mbar, the molecular weight $M_W$, $M_N$ and the vinylidene group contents of the residue obtained were determined.

The results are reported in the table which follows. The internal reactor temperature in all examples was about −18° C. and the steady state isobutene concentration about 4.1% by weight.

| Ex. | $BF_3$ [mmol/h] | Methanol [mmol/h] | Acetone [mmol/h] | 2-Ethyl hexanol [mmol/h] | Molar mass $M_N$ | $M_W/M_N$ | Vinylidene [%] |
|---|---|---|---|---|---|---|---|
| Comp. | 8.55 | 15.75 | — | 0.43 | 980 | 1.65 | 90 |
| 1 | 6.78 | 14.06 | 0.34 | 1.49 | 930 | 1.61 | 90 |
| 2 | 5.01 | 11.25 | 0.69 | 2.52 | 960 | 1.64 | 88 |
| 3 | 4.42 | 8.44 | 1.03 | 1.22 | 930 | 1.62 | 86 |

The results show that when small amounts of acetone are used, the use of $BF_3$ can be reduced without impairing the properties of the resulting polyisobutene.

We claim:

1. A process for preparing polyisobutene having a content of terminal vinylidene groups of at least 75 mol %, comprising:
polymerizing isobutene or isobutenic hydrocarbon mixtures in the liquid phase in the presence of a boron trifluoride complex catalyst of the composition

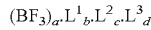

wherein
$L^1$ is water, a primary $C_1$–$C_5$-alkanol and/or a secondary $C_3$–$C_5$-alkanol,
$L^2$ is at least one aldehyde and/or one ketone,
$L^3$ is an ether having at least 5 carbon atoms, a secondary alkanol having at least 6 carbon atoms, a primary alkanol having at least 6 carbon atoms and/or a tertiary alkanol, and wherein
the b:a ratio is in the range from 0.9 to 3.0,
the c:a ratio is in the range from 0.01 to less than 0.5,
the d:a ratio is in the range from 0 to 1.0.

2. The process as claimed in claim 1, wherein $L^1$ is selected from the group consisting of water, methanol, ethanol, 2-propanol, 1-propanol and mixtures thereof.

3. The process as claimed in claim 1, wherein $L^2$ is selected from the group consisting of formaldehyde, acetaldehyde, propionaldehyde, n-butyraldehyde, isobutyraldehyde, acetone, methyl ethyl ketone, diethyl ketone and mixtures thereof.

4. The process as claimed in claim 1, wherein the d:a ratio is in the range from 0.1 to 1.

5. The process as claimed in claim 4, wherein $L^3$ is selected from the group consisting of methyl tert-butyl ether, di-n-butyl ether, di-n-hexyl ether, dioctyl ether and mixtures thereof.

6. The process as claimed in claim 4, wherein $L^3$ is selected from primary alcohols having β-branching.

7. The process as claimed in claim 6, wherein $L^3$ is selected from the group consisting of 2-ethylhexanol, 2-propyiheptanol, the oxo alcohols of dimeric, trimeric and tetrameric propylene, dimeric butene, trimeric butene and mixtures thereof.

8. The process as claimed in claim 4, wherein $L^3$ is tert-butanol.

9. The process as claimed in claim 4, wherein $L^3$ is selected from the group consisting of n-hexanol and n-octanol.

10. The process as claimed in claim 1, wherein the polyisobutene has a number-average molecular weight $M_n$ ranging from 500 to 2500 dalton.

11. The process as claimed in claim 1, wherein from 0.5 to 10 mmol of complexed boron trifluoride catalyst, calculated as $BF_3$, reacts with olefin monomers, on a per mole basis, in the isobutenic hydrocarbon mixture.

12. The process as claimed in claim 1, wherein the polymerization reaction is conducted at a temperature within the range of 0 to −40° C. at a pressure of 0.5 to 20 bar (absolute).

13. The process as claimed in claim 1, wherein the polymerization reaction is conducted at a temperature within the range of 0 to −30° C.

* * * * *